J. G. MERRITT & F. W. WATKINS.
ROTARY SWING.
APPLICATION FILED JAN. 25, 1915.
1,155,944.
Patented Oct. 5, 1915.
3 SHEETS—SHEET 2.
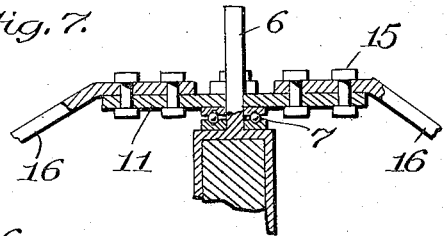
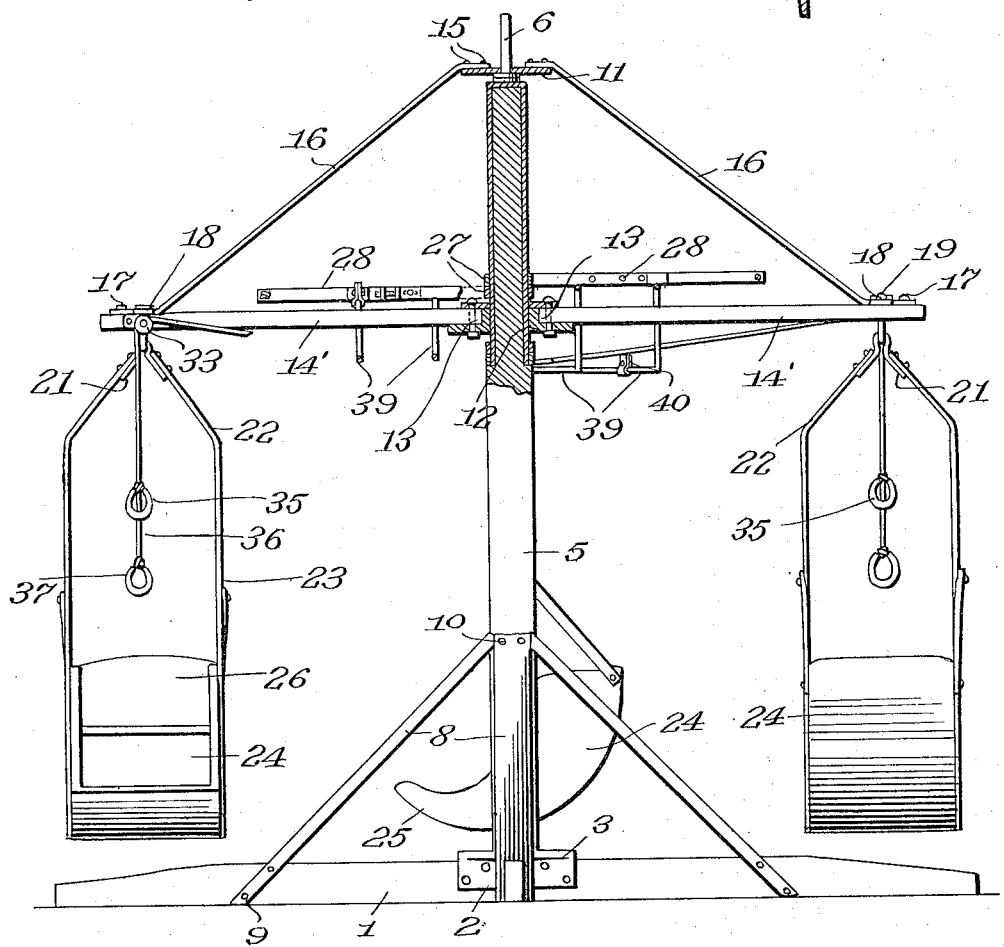

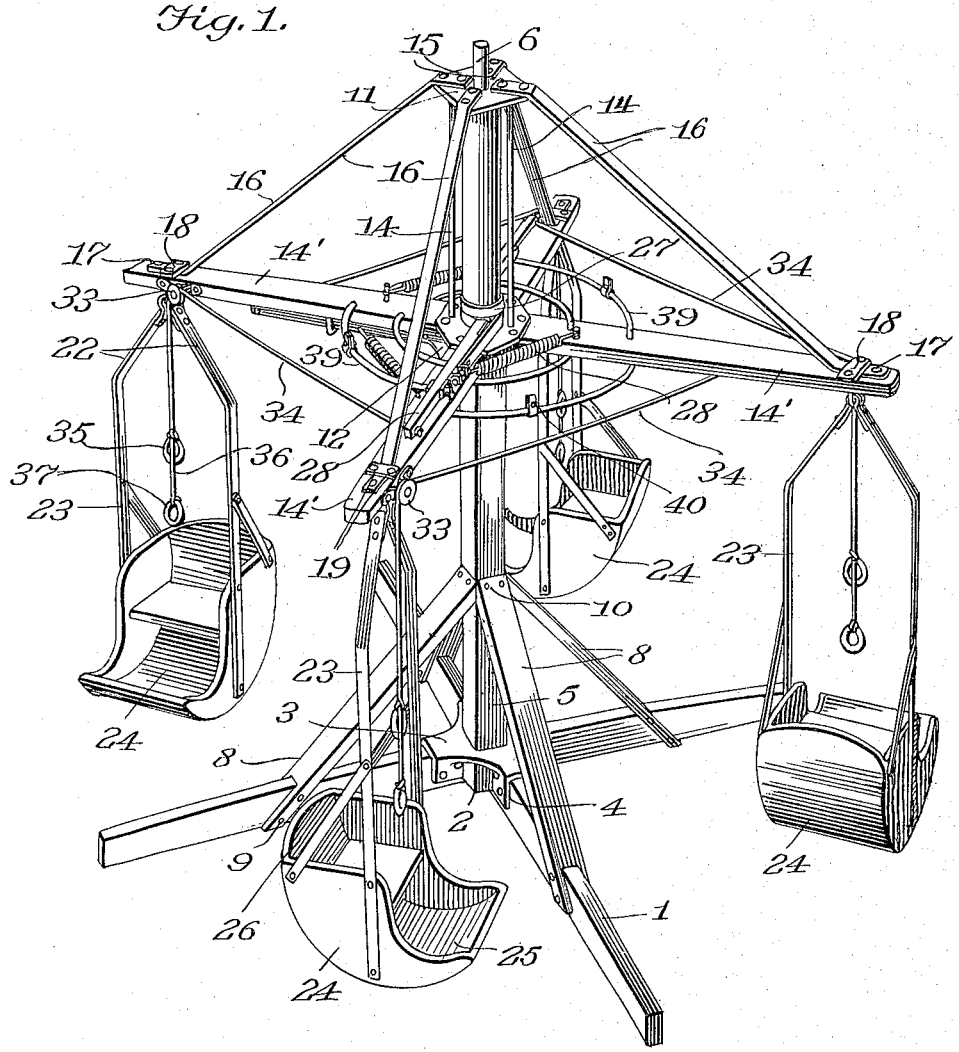

J. G. MERRITT & F. W. WATKINS.
ROTARY SWING.
APPLICATION FILED JAN. 25, 1915.
1,155,944.
Patented Oct. 5, 1915.
3 SHEETS—SHEET 3.
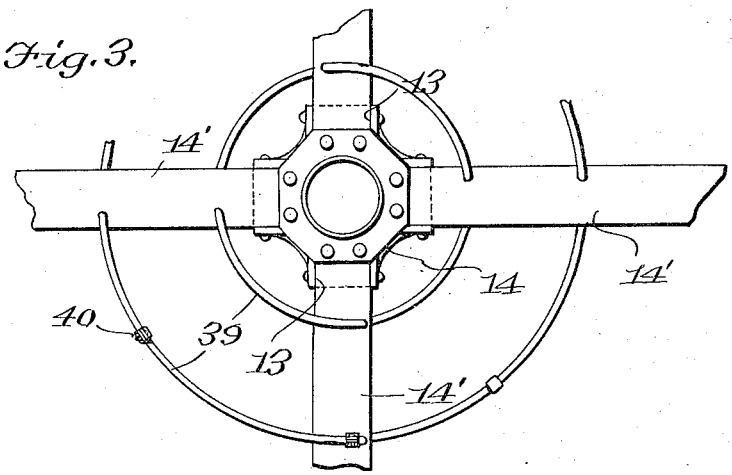
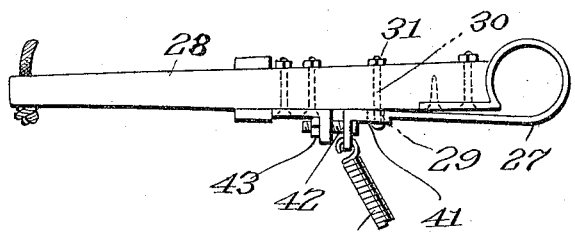
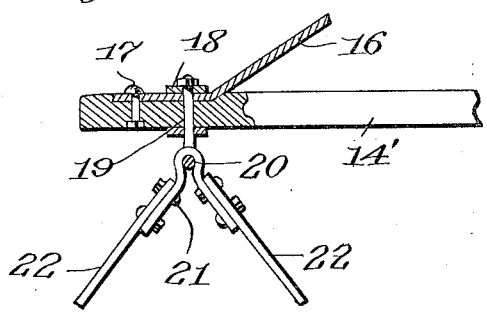
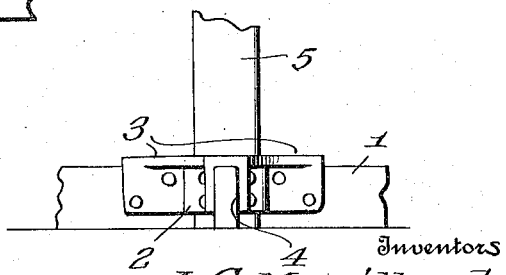
Inventors
J. G. Merritt and
F. W. Watkins,
By Victor J. Evans
Attorney
Witnesses

UNITED STATES PATENT OFFICE.

JAMES G. MERRITT AND FRED W. WATKINS, OF NEWBURGH, NEW YORK.

ROTARY SWING.

1,155,944. Specification of Letters Patent. Patented Oct. 5, 1915.

Application filed January 25, 1915. Serial No. 4,324.

*To all whom it may concern:*

Be it known that we, JAMES G. MERRITT and FRED W. WATKINS, citizens of the United States of America, residing at Newburgh, in the county of Orange and State of New York, have invented new and useful Improvements in Rotary Swings, of which the following is a specification.

This invention relates to improvements in rotary swings and has particular application to a hand operated swing.

In carrying out the present invention, it is our purpose to provide a hand operated rotary swing which will be found especially useful at playgrounds, picnic grounds and other places of amusement and which may be operated by the children or other occupants of the swing.

It is also our purpose to provide a swing of the class described whereby the chest and arm muscles of the occupants thereof will be brought into play when operating the swing, thereby promoting the development of such muscles.

A further object of our invention is to improve and simplify the general construction of hand operated rotary swings and to provide a swing wherein the component parts will be so arranged and correlated as to reduce the possibility of derangement to a minimum.

With the above and other objects in view, the invention consists in the construction, combination and arrangement of parts hereinafter set forth in and falling within the scope of the claims.

In the accompanying drawings: Figure 1 is a perspective view of a rotary swing constructed in accordance with my present invention. Fig. 2 is a vertical central sectional view therethrough. Fig. 3 is an enlarged fragmentary horizontal sectional view through the same. Fig. 4 is a similar view showing one of the operating levers in top plan. Fig. 5 is an enlarged fragmentary sectional view through the outer end of one of the supporting arms showing the connection between such arm and the seat. Fig. 6 is an enlarged fragmentary sectional view through the base showing the connection between the latter and the center post. Fig. 7 is an enlarged fragmentary sectional view through the upper end of the center post.

Referring now to the drawings in detail, 1 designates a base preferably, although not necessarily, formed of cross bars secured together at their central portions by means of a malleable iron casting 2 formed with radial arms 3 spaced apart equidistant and having the outer ends thereof slotted vertically as at 4 to accommodate the cross bars. 5 designates a vertical center post or mast having the lower end thereof seated in the collar 2 and suitably secured therein, and the upper extremity thereof provided with an upstanding pin 6 and encircling the lower portion of the pin 6 and seated upon the adjacent extremity of the center post is an anti-friction end thrust bearing 7 of some suitable construction. Brace rods 8 have the lower ends thereof secured to the respective bars of the base through the medium of securing bolts 9, and the upper extremities thereof engaged with the center post 5 and secured thereto through the medium of screws 10, such brace rods serving to reinforce the center post and hold the latter rigid. Rotatably mounted upon the pin 6 and resting upon the end thrust bearing 7 is a plate 11, while encircling the center post 5 at a suitable distance below the plate 11 is an annular collar 12 capable of rotation about the center post and formed with peripheral sockets 13 spaced apart equal distances. Connecting the plate 11 with the collar 12 so as to support the latter are vertical connecting rods 14 having the upper extremities thereof suitably secured to the plate 11 and the lower ends appropriately fastened to the collar 12. Disposed within the sockets 13 and secured therein through the medium of bolts or other fastening devices are the inner extremities of supporting arms 14' radiating from the collar and having the outer extremities thereof terminating in alinement with the edge of the base 1 and designed to traverse a circular path in the rotation of the collar 12 about the center post.

Secured to the plate 11 by means of bolts 15 are the inner ends of hanger straps 16 corresponding in number with the arms 14' and having the outer ends thereof fastened to the upper surfaces of the respective arms adjacent to the outer extremities thereof. In the present instance, the connections between the outer end of each hanger strap and arm 14' comprises a bolt 17 passed through alining openings in the strap and arm, and a clamping plate 18 lying upon the end of the strap transversely thereof and having the end portions formed with bolt holes alining with similar holes in the arms to receive securing bolts 19, the bolts 19 and plates 18 coöperating with the bolts 17 to effect a rigid connection between the hanger straps and the arms.

In the present instance, the lower extremities of the bolts 19 of each pair are formed integral with a yoke 20 arranged transversely of the arm 14' and spaced apart from the under surface thereof and suspended from the yoke 20 is a hanger plate 21 having the central portion thereof curved in cross section to conform to the horizontal bar of the yoke and receive such bar, and the end portions diverging outwardly from the curved central portion. Secured to the outwardly diverging end portions of each hanger plate 21 through the medium of bolts or the like are the converging upper extremities 22 of hanger bars 23 depending from the arm 14'. Disposed between the lower extremities of the respective portions of coöperating hanger bars 23 and secured to such bars are seats 24 provided with foot rests 25 and backs 26.

Encircling the center post 5 are gripping bands 27 formed of metal and corresponding in number with the arms 14'. In the present instance, these bands are equally divided in numbers and one-half placed above the arms and the remaining half placed below the arms and each comprises a strip of metal having one end secured to the inner extremity of a lever 28 and the remaining portion trained about the center post and disposed in face to face contact with the adjacent edge of the lever 28. The portion of the band 27 in contact with the edge of the lever 28 is formed with elongated slots 29 registering with openings 30 formed in the lever and through these registering slots and openings are passed securing bolts 31 whereby the band is secured to the lever. These levers 28 correspond in number with the bands 27 and radiate from the center post and lie parallel with the respective arms 14', the levers connected with the bands above such arms overlying the latter, while the levers connected with the bands below the arms are disposed beneath the latter.

Each arm 14 adjacent to the outer end thereof is provided with a sheave 33, while fastened to the outer end of each lever 28 in some suitable manner is one extremity of a cord 34 or other flexible element and the remaining extremity of the cord 34 is passed through the slot 32 in the arm 14 immediately behind the particular arm 28 and over the sheave 33 in such slot, while the extremity of the cord is looped as at 35 to provide a hand grip disposed within convenient reach of the occupant of the seat. If desired, a short section of rope 36 may be fastened to the depending portion of the rope 34 and have the lower end thereof looped to provide a hand grip 37 disposed below the grip 35 so as to be readily grasped by small children within the seat. The bands 27 are normally held in released position, that is, out of binding engagement with the center post 5 and in order to so hold the bands coiled expansion springs 38 each has one end fastened to one of the levers 28 and the remaining end secured to the arm 14' at the side of the lever opposite from the seat from which the lever is operated. Disposed below each lever above the supporting arms 14' and above each lever below the supporting arms is a curved rail 39 having one end thereof secured to the arm paralleling the particular lever and the remaining end fastened to the arm behind such lever, and adjustably mounted upon each rail 39 is a stop 40 adapted to engage the adjacent lever in the rotation of the arms.

In practice, the occupants of the seats of the swing exert a pull upon the respective cords or ropes 34 and upon the initial pulling of the cords the respective levers 28 are actuated to bind the gripping bands 27 against the post 5, while in the continued pulling of the cords the arms 14 paralleling the respective levers move away from the latter. In this movement of the arms, the rails 39 travel relatively to the levers and the stops 40 engage the adjacent edges of the levers so as to relieve the latter of the influence of the cords whereby the springs 38 react and so restore the levers 28 to positions parallel with the respective arms whereby the above cycle of operation may be repeated when a fresh pull is exerted upon the ropes. Thus, the arms 14 will be caused to revolve about the center post continuously by the intermittent pulling of the cords. It will be seen that when the arms 14 move away from the respective levers 28, the contractile springs 38 connected with the levers and the arms in advance of such levers will be placed under tension so as to restore the levers to normal position upon the stops 40 engaging the same. These stops 40 are adjustable along the respective rails 39 so that the length of the stroke of the ropes may be varied.

In the present instance, the outer end of each band 27, that is, the end in engagement with the edge of the particular lever 28, is secured with a clamp 41 capable of longitudinal movement along the edge of the lever through the medium of an adjusting screw 42 engaging the clamp and an angle iron 43 secured to the edge of the lever. Thus, any slack in the band 27, incident to wear, may be taken up, the slots 29 permitting sliding of the end portions of the band relatively to the bolts 31 during adjustment.

While we have herein shown and described one preferred form of our invention by way of illustration, we wish it to be understood that we do not limit or confine ourselves to the precise details of construction herein described and delineated, as modification and variation may be made within the scope of the claims without departing from the spirit of the invention.

We claim:

1. A rotary swing comprising a vertical center post, a collar encircling said post and rotatable thereabout, arms secured to said collar and radiating therefrom, a plate on the upper end of said post and capable of rotation relatively to the post, connections between said plate and collar whereby the latter will be supported upon the post, connections between said plate and the outer ends of said arms, seats suspended from the outer extremities of said arms, and means for rotating said collar, arms and plate about said center post.

2. Intermittent gripping mechanism comprising a center post, means rotatable about said post, gripping bands encircling said post, levers connected to said bands respectively and radiating from the post, pull ropes each having one end secured to the outer end of one of said levers and the remaining end adapted to be pulled by a person on said rotatable means to actuate said levers inwardly to bind the bands against said center post, and subsequently move said means about said center post relatively to said levers, means for limiting the length of the stroke of said ropes whereby said levers will be relieved of the influence of the ropes, and coiled contractile springs each having one end secured to one of said levers and the remaining end secured to said rotatable means in advance of the lever, said springs acting to restore the levers to normal position when the levers are relieved of the influence of the ropes.

In testimony whereof we affix our signatures in presence of two witnesses.

JAMES G. MERRITT.
FRED W. WATKINS.

Witnesses:
HARRY L. WELLS,
D. CLINTON DOMINICK.

Copies of this patent may be obtained for five cents each, by addressing the "Commissioner of Patents, Washington, D. C."